Feb. 24, 1970  R. L. BALLARD  3,496,973
CUTTING TOOL EDGE CONSTRUCTION
Filed April 12, 1967  2 Sheets-Sheet 1

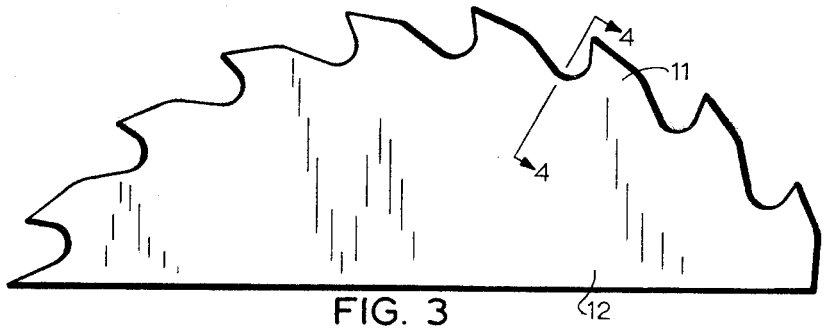
FIG. 3

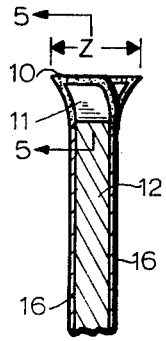
FIG. 4

FIG. 2

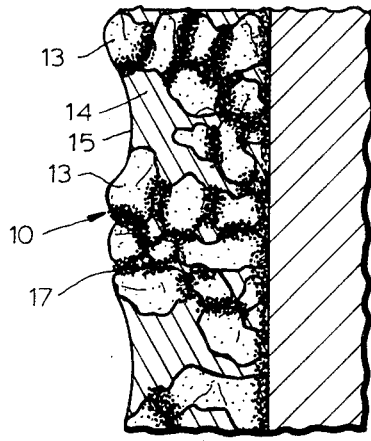
FIG. 5

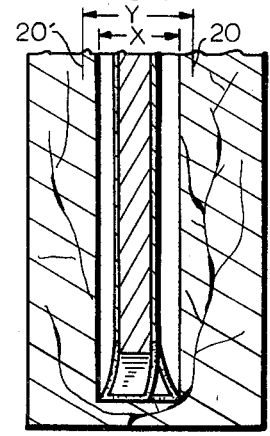
FIG. 6

```
┌─────────────────────────────────────┐
│ Preparation of saw blank to receive │
│ polytetrafluoroethylene copolymer   │
│ and tungsten carbide bort           │
└─────────────────────────────────────┘
                 ↓
┌─────────────────────────────────────┐
│ Combining a tungsten carbide        │
│ grit with cobalt matrix             │
└─────────────────────────────────────┘
                 ↓
┌─────────────────────────────────────┐
│ Spraying the tungsten carbide-cobalt│
│ onto saw teeth surfaces with plasma arc jet │
└─────────────────────────────────────┘
                 ↓
┌─────────────────────────────────────┐
│ Building a grit deposit on the saw  │
│ teeth to a depth of from 0.7 mils   │
│ to 1.3 mils                         │
└─────────────────────────────────────┘
                 ↓
┌─────────────────────────────────────┐
│ Electrostatically spraying a suspensoid │
│ of polytetrafluoroethylene copolymer│
│ and vehicle onto the blade surface and │
│ grit deposit                        │
└─────────────────────────────────────┘
                 ↓
┌─────────────────────────────────────┐
│ Pre-baking blade and coating for 15 │
│ minutes at 350°F to remove vehicle  │
└─────────────────────────────────────┘
                 ↓
┌─────────────────────────────────────┐
│ Curing copolymer on blade by        │
│ baking for 30 minutes at 550°F      │
└─────────────────────────────────────┘
```
FIG. 1

INVENTOR.
Robert L. Ballard
BY
ATTORNEYS

Feb. 24, 1970   R. L. BALLARD   3,496,973
CUTTING TOOL EDGE CONSTRUCTION
Filed April 12, 1967
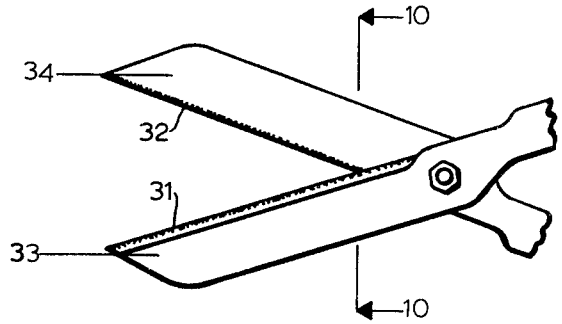
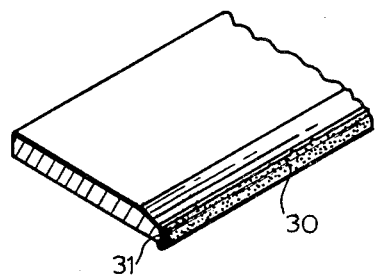
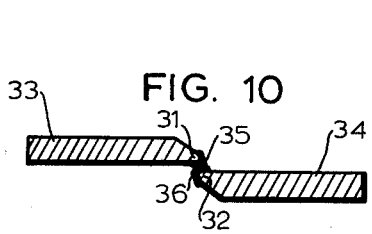
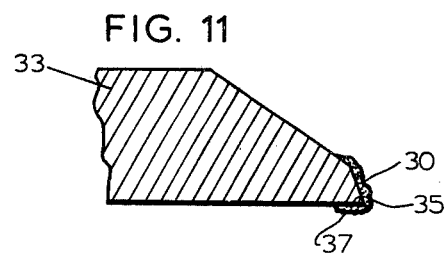
INVENTOR.
Robert L. Ballard

United States Patent Office 3,496,973
Patented Feb. 24, 1970

3,496,973
CUTTING TOOL EDGE CONSTRUCTION
Robert L. Ballard, 532 Squire Place,
Pittsburgh, Pa. 15237
Filed Apr. 12, 1967, Ser. No. 630,260
Int. Cl. B27b *33/08*
U.S. Cl. 143—133
12 Claims

ABSTRACT OF THE DISCLOSURE

In this invention, the cutting edges of a saw blade tooth and the shearing edges of scissors, hedge clippers and the like are provided with a bort comprised of tungsten carbide particles or grit which are anchored on the cutting and shearing edges by a metallic matrix. The bort, which initially is fluid pervious, is saturated with a fluorinated polyolefin. With reference to the saw blade, the copolymer is also laminated onto the side surfaces of the teeth and the blade and, in combination with the bort, adapts the saw blade to have a reduced teeth set which produces a narrower kerf in a workpiece upon passing through the same.

CROSS-REFERENCE TO RELATED APPLICATION

The present invention relates to and is an improvement over an application, Ser. No. 614,466, filed by me on Feb. 7, 1967. The present and the subject copending applications are related in that each of the inventions teaches the coating of a saw blade with a fluorinated polyolefin to reduce the kerf width produced upon cutting a workpiece.

BACKGROUND OF THE INVENTION

Field of the invention

This invention relates to the application of an abrasive bort to the sharp edges of a cutting tool and, more specifically, to the tooth portions of a saw blade and to the shearing surfaces of scissors-like implements and to the impregnating of the abrasive bort with a fluorinated polyolefin.

Description of prior art

The prior art teaches various abrading tools which have as the abrading layer a tungsten carbide bort. Representative references teaching such a combination are U.S. Patents 3,248,189 to Harris, 3,205,624 to Weiss, 3,115,401 to Downing and 2,924,050 to Barron. These references are concerned primarily with the problem of providing a surface or cutting edge with a wear resistant layer of matter, with reducing the kerf and with the building up of residue material within the interstices of the carbide surface. U.S. Patent 2,855,669 to Duke teaches a circular saw having the body and teeth portions of the same coated with polytetrafluoroethylene, the saw being especially adapted for cutting wet formed laminated articles of asbestos paper containing wet sodium silicate adhesive. The Duke patent has the particular disadvantage of not being adapted to cut dry material; for such material even soft material, scrapes the polytetrafluoroethylene from the surface of the saw and thus limits its life to only a few cuts. It was stated in the Duke patent that the polytetrafluoroethylene coating was not effective for any useful purpose in cutting dry work because it quickly strips from the saw blade and that the invention was directed only toward the cutting of wet compositions, specifically, compositions being comprised of asbestos and wet sodium silicate. The only coating of polytetrafluoroethylene disclosed by the Duke patent was a homopolymer of the same which was applied to the saw blades in any conventional manner and which included the usual characteristics of being stripped from the blades when engaging a surface.

SUMMARY OF THE INVENTION

The present invention overcomes the foregoing disadvantages by providing the teeth of a saw, the shearing surfaces of scissors-like apparatus and the cutting edges of other tools with a tungsten carbide cutting surface and by providing the interstices between the tungsten carbide grit particles with a copolymer of tetrafluoroethylene and another ethylenically unsaturated monomer being copolymerizable therewith. The side surfaces of the saw blade and teeth may also be coated with the polytetrafluoroethylene copolymer. An example of the polytetrafluoroethylene copolymer used in this invention is sold under the trade name of Teflon S958-202 which may be purchased in a form of a colloidal dispersion from E. I. du Pont de Nemours and Company, Inc. of Wilmington, Del. The coating of the polytetrafluoroethylene copolymer has a pencil hardness of at least 2H whereas the polytetrafluoroethylene homopolymers of the prior art have a pencil hardness of, at best, only 4B. The tungsten carbide has a hardness approaching that of diamonds. It has been found that for substrate hardnesses of below Rockwell "C" 25, the carbide will flake off and for hardnesses of above Rockwell "C" 62, the teeth become too brittle and are subject to being broken from the steel blade. Tungsten carbide has been selected as the abrasive grit for the purposes of illustrating this invention; however, other suitable abrasive and long-lasting grits may be used such as aluminum oxide, silicon carbide, titanium carbide, garnet, industrial diamonds, sapphires and the like. Therefore, where the abrasive grit is referred to as being tungsten carbide, any abrasive grit having substantially the same characteristics may be substituted therefor. Furthermore, the tungsten carbide-tetrafluoroethylene copolymer composition of this invention may be applied to the teeth of common hand saws, standard circular saws, swaged saws, band saws and the like, and to the shearing surfaces of scissors, grass shears, hedge shears, lopping shears, anvil pruners and the like.

The composite saw blade of this invention overcomes several of the disadvantages as were existent in the prior art and a few of such disadvantages are herein set forth. Conventionally, the spaces between the tungsten carbide particles load up with the material removed from the workpiece thereby preventing the tungsten carbide particles from acting as individual cutters, thus, significantly reducing the performance of the blade. By filling the interstices between the tungsten carbide grit with the tetrafluoroethylene copolymer, the build-up of the material removed from the workpiece is eliminated. Since the polytetrafluoroethylene copolymer exhibits excellent lubricating properties, the heat produced by cutting is substantially reduced and the blade may more easily pass through the particular workpiece. The polytetrafluoroethylene copolymer may be coated onto the side surfaces of the saw blade so as to allow the reduction of the width of the kerf which is cut into the workpiece by the saw blade. The polytetrafluoroethylene copolymer is not scratched from the surface of the saw blade as taught by the prior art for the copolymer of this invention has excellent cold flow properties in that if the layer of polytetrafluoroethylene copolymer is punctured by an external means, the repeated passing of the coated blade through the workpiece, which is contemplated to be wood or the like, tends to seal the opening made by the external material and after a relatively few passes through the wood, the scratch is sealed with no significant damage being done to the coating. Since the polytetrafluoroethylene copolymer has inherent lubricating properties, the saw blade does not tend to become bound within the workpiece and, therefore, the width of the kerf may be reduced by as much as twenty-five percent. The reduction in kerf results in a saving in material and in the energy required to pass the saw blade through the workpiece.

In regard to the application of the combination of tungsten carbide and tetrafluoroethylene copolymer as taught above to the shearing surfaces of hedge clippers and the like, it has heretofore been impossible to provide the contacting shearing surfaces with tungsten carbide due to the excessive friction which is generated when the surfaces pass by each other. However, by filling the interstices in the tungsten carbide bort with the tetrafluoroethylene copolymer as taught by this invention, the contacting shearing surfaces are adapted to slide past one another and function to shear a workpiece in a normal manner. Thus, the shearing surfaces of hedge clippers and the like are provided with an extremely long-lasting shearing edge without impairing the operating function of the same.

Therefore, an object of this invention is to reinforce the cutting edges of a saw blade tooth with a coating of tungsten carbide particles and to fill the interstices between adjacent tungsten carbide particles with a polytetrafluoroethylene copolymer.

Another object of this invention is to provide a saw blade which is adaptted to produce a narrower kerf in the workpiece being cut thereby reducing the energy which must be expended to move the blade through the material.

A further object of this invention is to provide the teeth of a saw blade with a layer of grit material which is self-lubricating.

Yet another object of this invention is to provide a tungsten carbide tipped saw blade with a coating of polytetrafluoroethylene copolymer which has cold flow properties such that upon the scratching of the surface of the coating, the repeated passing of the saw blades through the workpiece seals the scratch and provides once again a smooth, near-frictionless surface.

A still further object of this invention is to provide the shearing surfaces of hedge clippers and the like with a hardened, self-lubricating layer of grit material formed by filling the interstices of a tungsten carbide bort with a tetrafluoroethylene copolymer.

These and other objects of this invention will become apparent when the following detailed description is read in conjunction with the accompanying drawings.

DESCRIPTION OF THE DRAWINGS

FIGURE 1 is a process flow diagram showing the various steps through which the saw blade is passed in order to achieve the tungsten carbide tipped polytetrafluoroethylene copolymer coated saw blade of this invention;

FIGURE 2 is a partial section view taken through a conventional saw blade and showing, greatly enlarged, the set of the saw blade teeth;

FIGURE 3 is a fragmentary elevation side view showing the cutting teeth of the saw blade having received the tungsten carbide bort and the polytetrafluoroethylene copolymer;

FIGURE 4 is a partial section view taken along lines 4—4 of FIGURE 3 showing a portion of the saw blade and the saw teeth with the respective coatings of tungsten carbide and polytetrafluoroethylene;

FIGURE 5 is a greatly enlarged sectional view taken along lines 5—5 of FIGURE 4 showing the buildup of tungsten carbide particles on the surface of the saw blade teeth and the polytetrafluoroethylene which has filled the interstices formed by the tungsten carbide particles;

FIGURE 6 is a section view taken through a portion of a saw blade of this invention with the same having made a cut in a workpiece and showing the width of the kerf produced thereby;

FIGURE 7 is a partial section view taken through a swaged saw blade and showing, greatly enlarged, the inwardly sloping surfaces forming an individual tooth thereof;

FIGURE 8 is a fragmentary plan view of a pair of hedge clippers showing the shearing surfaces thereof having received the tungsten carbide-tetrafluoroethylene copolymer coating;

FIGURE 9 is an enlarged, fragmentary perspective view of a portion of the hedge clipper blade showing the coating of tungsten carbide and tetrafluoroethylene copolymer having been applied to the shearing surface of the same;

FIGURE 10 is an enlarged section view taken along lines 10—10 of FIGURE 8 showing the shearing surfaces of the blades in contact; and FIGURE 11 is a greatly enlarged, fragmentary section view of the blade shearing surface showing the same having received the coating of tungsten carbide and tetrafluoroethylene copolymer.

DESCRIPTION OF THE PREFERRED EMBODIMENT

In accordance with one embodiment of this invention, the teeth of a saw blade, which may be a circular saw, band saw, hand saw, swaged saw or the like, is provided with a tungsten carbide bort which is adhered to the teeth portions of the saw blade by means of a matrix such as cobalt and a coating of a polytetrafluoroethylene copolymer which is deposited onto the side surfaces of the saw blade and in the interstices formed by the tungsten carbide grit which comprise the bort. The polytetrafluoroethylene copolymer is comprised of a copolymer of tetrafluoroethylene and another ethylenically unsaturated monomer which is copolymerizable therewith.

An example of the saw blade of this invention is comprised of standard cold roll steel having an AISI designation of C–1074. Steel of this type is passed through a blanking machine which stamps out the saw blade and, simultaneously, cuts the teeth around the peripheral edges thereof. The saw blades are then further shaped, degreased and heat treated.

The saw blade of this invention is prepared by first applying the tungsten carbide bort 10 to the surfaces of saw tooth 11 of saw blade 12. Since the individual grit particles 13 which collectively comprise tungsten carbide bort 10 create various openings and cavities within bort 10, as denoted by reference numeral 14, such cavities 14 are filled with a polytetrafluoroethylene copolymer 15. A film of polytetrafluoroethylene 16 is applied to the side surfaces of saw blade 12 simultaneously with the filling of the cavities 14.

After the blade teeth have been formed, sharpened and heat treated, tungsten carbide bort 10 is applied to teeth 11 by means of a plasma arc jet which may be purchased from Avco "Bay State Abrasives Division," Westboro, Mass. The plasma arc jet heats the tungsten carbide grit 13 and cobalt matrix 17 to a temperature of approximately 40,000° F. while the same are being sprayed onto the surface of teeth 11. Other adhesive substances may be substituted for cobalt, such as, nickel-chromium-boron alloy, a molybdenum and cobalt alloy and the like. The mixture of tungsten carbide and cobalt is approximately eighty percent carbide and twenty percent cobalt so that the cobalt does not fill the voids between the tungsten carbide 13 but merely cements each individual particle to another and various particles to blade 12 as shown in FIGURE 5. In a typical application, the tungsten carbide grit particles 13 range in size from 200 to 225 microinches in length and the thickness on the edge of the teeth ranges from 0.07 to 1.3 mils. To prepare blade 12 to receive the laminate of polytetrafluoroethylene copolymer, it is provided with an oxide coating in the conventional manner by heating the same in an oxide inducing atmosphere. Once the oxide coating has formed thereon, the blade and teeth surfaces are sprayed with a cold colloidal dispersion of the polytetrafluoroethylene copolymer while the blade is at room temperature or less than 200° F. The saw blade is immediately placed into an oven and is prebaked at a temperature of about 350° F. for approximately fifteen minutes. The particular liquid vehicle which serves as a carrier for the polytetrafluoroethylene copolymer is flashed therefrom. The blades are then cured at a temperature of at least 550° F. for at least fifteen minutes whereupon the thickness of the polytetrafluoroethylene coating on the side surfaces of blade 12 ranges from approximately 0.5 mil to 1.5 mils with the preferred being approximately 0.6 mil. More specifically, the time-temperature curing conditions found to be especially operative are as follows: 550° F. for thirty minutes, 650° F. for twenty minutes and 720° F. for five minutes.

The saw blades of the prior art after the teeth were formed were then polished, etched, neutralized and coated with a polymer lacquer which prevents rust from forming thereon. In the present invention, however, the blades are provided with a smooth surface and, therefore, do not have to be polished, etched or neutralized and since the type of polytetrafluoroethylene used in this invention exhibits corrosive resistance the step of applying a polymer lacquer to prevent rusting is also eliminated.

In saw blades of the type as contemplated by this invention, and especially circular saws, the width of the kerf produced by the saw of the prior art passing through the workpiece is approximately thirty-five percent greater than the width of the saw blade. A standard circular saw blade of the type contemplated is approximately 7¼ inches in diameter and has twenty-four teeth equidistantly spaced around the periphery thereof. The thickness of the blade is $\frac{1}{16}$ of an inch or 0.0625 inch. The teeth of a standard prior art circular saw blade protrude approximately 0.0185 inch from both sides of the parallel surfaces of the saw blade so as to provide a kerf wide enough for the remainder of the blade to easily pass therethrough. Thus, the total width of the prior art blade is approximately 0.100 inch thick and upon cutting through a workpiece will produce a kerf of substantially that same width. It was found that by providing the saw teeth of the saw blade with a tungsten carbide bort and by filling the cavities in the bort with a polytetrafluoroethylene copolymer, the total width of the saw blade may be reduced from the standard of 0.100 to 0.0775 inch thereby reducing the kerf width by approximately twenty-two and one-half percent. Resultingly, the teeth of the saw blade protrude only approximately 0.0075 inch from either side of the parallel surfaces of the saw blade thereby reducing the width of protrusion by approximately fifty percent. Therefore, since a wide kerf requires more energy to produce, the reduction of the width of the kerf at least twenty-two and one-half percent conserves a proportional amount of energy when making a similar cut or, correspondingly, the saw blade may pass through the wooden object at a proportionately greater speed while using only an equal amount of energy.

In FIGURE 6, the width of the kerf formed by saw blade 12 is represented by the letter X which is substantially equal to width Z of the teeth set as shown in FIGURE 4. However, if a saw blade of the prior art were used such as is shown in FIGURE 2, the width of the kerf would be as shown by lines 20 and 20′ and is represented by the letter Y which is substantially the equal to width R of the teeth set. Thus, it can be seen that the reduction in the kerf width is at least twenty percent of what normally could be expected from such a cut through a like piece of wooden material.

In reference to FIGURES 8, 9, 10 and 11, a coating 30 being comprised of tungsten carbide and a copolymer of tetrafluoroethylene is received by shearing surfaces 31 and 32 of cutting blades 33 and 34, respectively. The method for applying coating 30 to shearing surfaces 31 and 32 is equivalent to the method heretofore described for applying tungsten carbide bort 10 and tetrafluoroethylene copolymer 15 to the surfaces of saw tooth 11 of saw blade 12. The resulting coating 30 increased the life of shearing surfaces 31 and 32 to an extent that resharpening is not contemplated unless the surfaces are mistreated. With reference to FIGURE 10, it can be seen that only edges 35 and 36 of shearing surfaces 31 and 32 engage; therefore, portions of coating 30 which extends around edges 35 and 36 as denoted by reference numeral 37 in FIGURE 11 do not touch any part of blade 34 with the exception of edge 36.

While the lubricant heretofore mentioned has been a copolymer of polytetrafluoroethylene, other fluorinated olefinic polymers may be used, examples of which are fluorinated ethylene propylene, polychlorotrifluoroethylene, polyvinylidene fluoride and copolymers thereof. Therefore, when reference is made to fluorinated olefinic polymers of polytetrafluoroethylene, such reference is to include other fluorinated polymers having the lubricating characteristics.

While the embodiments of this invention have been directed primarily to saw blades and hedge clippers, the self-lubricating and reinforced cutting tool edge as herein shown and described is applicable to other tools wherein it is desirable to present a hardened cutting surface and edge which is adapted to penetrate the workpiece without becoming bound in the same, such as, axes, hoes and the like. Therefore, many modifications and changes may be made herein without departing from the essence of the invention and the scope hereof is not to be limited except as indicated in the appended claims.

What is claimed is:

1. A saw blade especially adapted for cutting workpieces comprising:
    (a) a steel body portion having substantially flat side surfaces and peripheral edges, said body portion being provided with cutting teeth forming portions of said peripheral edges, said teeth each including projecting cutting surfaces;
    (b) a deposit of abrasive bort bonded onto said cutting surfaces of said teeth, said bort being comprised of grit particles arranged in a manner to define minute cavities to adapt said bort to be fluid pervious; and
    (c) a lubricant received by said cavities and substantially filling the same, said lubricant being comprised of at least one fluorinated olefinic polymer.

2. The saw blade of claim 1 wherein said side surfaces of said saw blade are provided with a thin coating of a fluorinated olefinic copolymer.

3. The saw blade of claim 2 wherein said lubricant is comprised of a copolymer of tetrafluoroethylene and another ethylenically unsaturated monomer being copolymerizable therewith.

4. The saw blade of claim 2 wherein said lubricant is comprised of a copolymer of fluorinated ethylene propylene and another ethylenically unsaturated monomer being copolymerizable therewith.

5. The saw blade of claim 2 wherein said body portion is of uniform thickness.

6. The saw blade of claim 3 wherein said grit particles average in size from 200 to 250 microinches in length and the thickness of said bort is from 0.07 mil to 1.3 mils.

7. The saw blade of claim 6 wherein said tetrafluoroethylene copolymer has a pencil hardness of at least 2H.

8. The saw blade of claim 5 wherein alternate ones of said teeth protrude outwardly from a first selected flat surface with the remainder of said teeth protruding outwardly from a second selected flat surface, said thickness of said body portion is at least seventy-five percent of the lateral distance measured between the outwardly and oppositely projecting tips of adjacent teeth.

9. The saw blade of claim 5 wherein the grit particles are comprised of tungsten carbide.

10. The saw blade of claim 5 wherein the grit particles are comprised of titanium carbide.

11. A saw blade especially adapted for cutting workpieces comprising:
   (a) a steel body portion of uniform thickness having planar side surfaces and peripheral edges, said body portion being provided with shaped cutting teeth positioned and forming said peripheral edges, said teeth each including projecting cutting surfaces and being arranged so that alternate ones protrude outwardly a distance from a selected one of said side surfaces with the remainder of said teeth protruding outwardly from the other one of said side surfaces, said thickness of said body portion being at least seventy-five percent of the lateral distance measured between the outwardly and oppositely projecting tips of adjacent cutting teeth;
   (b) a deposit of tungsten carbide abrasive bort on said cutting surfaces of said teeth ranging from a thickness of 0.07 mil to 1.5 mils, said bort being comprised of grit particles arranged in a manner to define minute cavities to adapt said bort to be fluid pervious; and
   (c) a lubricant material saturating said cavities and forming a coating being bonded to said side surfaces of said body portion, said coating being from 0.5 mil to 1.5 mils, said lubricant material being comprised of a copolymer of tetrafluoroethylene and another ethylenically unsaturated monomer being copolymerizable therewith, said copolymer having a pencil hardness of at least 2H.

12. A circular saw blade adapted for cutting workpieces comprising:
   (a) a disc-shaped steel body portion having peripheral edges thicker than the body portion of the blade and said body portion being provided with cutting teeth forming said peripheral edges, said teeth having wide, laterally projecting cutting surfaces;
   (b) a deposit of metallic carbide abrasive bort on said cutting surfaces of said teeth ranging from a thickness of 0.07 mil to 1.5 mils, said bort being comprised of grit particles arrayed in a manner to define minute cavities to adapt said bort to be fluid previous; and
   (c) a lubricant material saturating said cavities and forming a coating being bonded to said side surfaces of said body portion, said coating being from 0.5 mil to 1.5 mils, said lubricant material being comprised of a copolymer of tetrafluoroethylene and another ethylenically unsaturated monomer being copolymerizable therewith, said copolymer having a pencil hardness of at least 2H.

References Cited
UNITED STATES PATENTS

| | | | |
|---|---|---|---|
| 2,855,669 | 10/1958 | Duke | 143—133 X |
| 3,353,526 | 11/1967 | Daem et al. | 51—206 |
| 3,340,216 | 9/1967 | Mack | 117—132 |

DONALD R. SCHRAN, Primary Examiner

U.S. Cl. X.R.

30—244; 51—109; 125—15